June 27, 1961 M. BODIAN ET AL 2,990,470
REFLECTING FLUORESCENT LIGHT FIXTURE
Filed March 10, 1958 4 Sheets-Sheet 1

INVENTORS
MARCUS BODIAN
WILLIAM B. ROSENFIELD
BY
ATTORNEY

June 27, 1961 M. BODIAN ET AL 2,990,470
REFLECTING FLUORESCENT LIGHT FIXTURE
Filed March 10, 1958 4 Sheets-Sheet 2
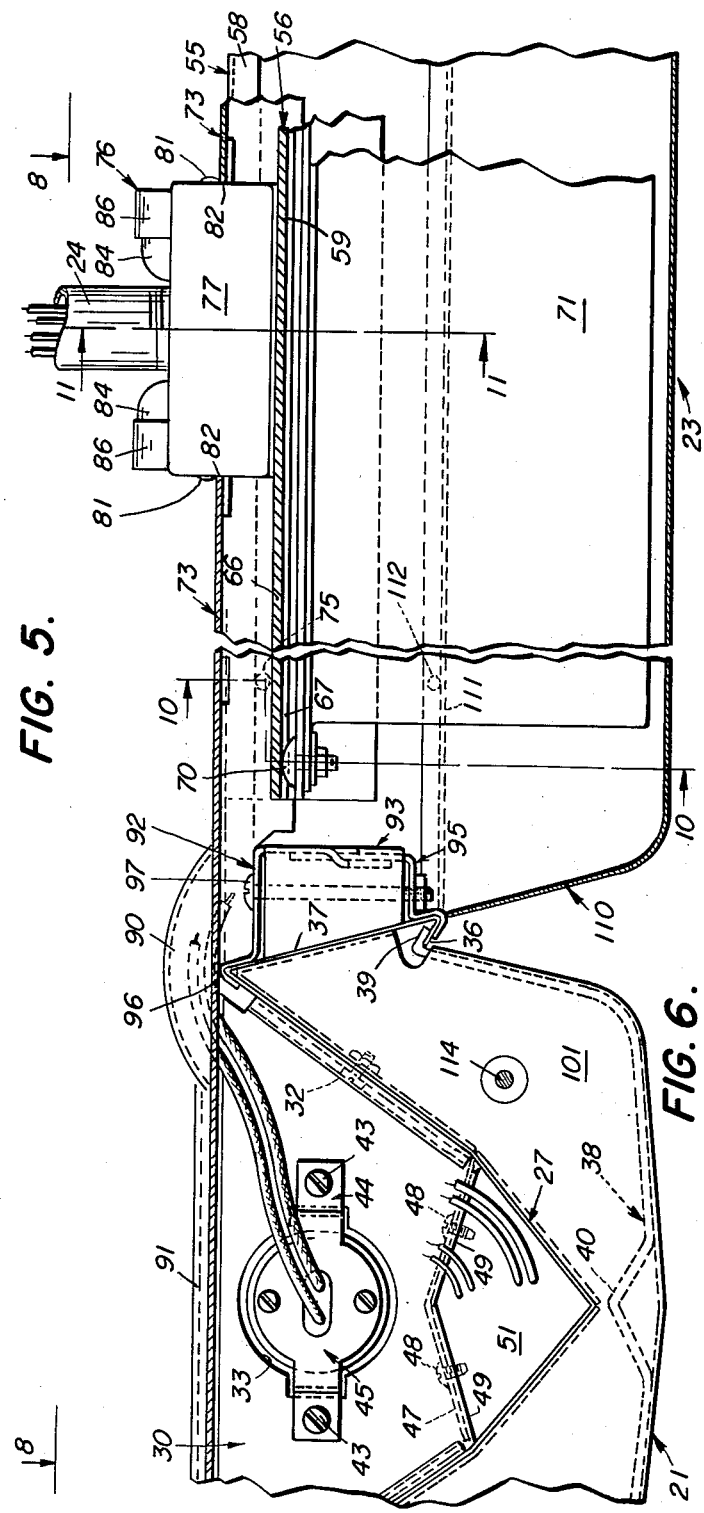
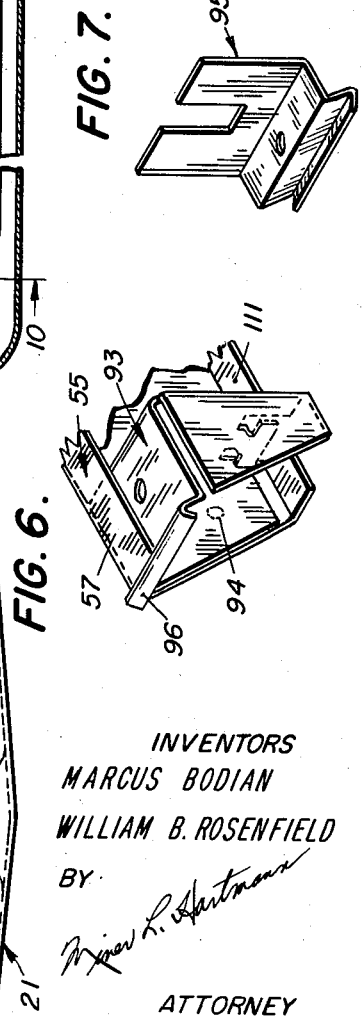
INVENTORS
MARCUS BODIAN
WILLIAM B. ROSENFIELD
BY
ATTORNEY

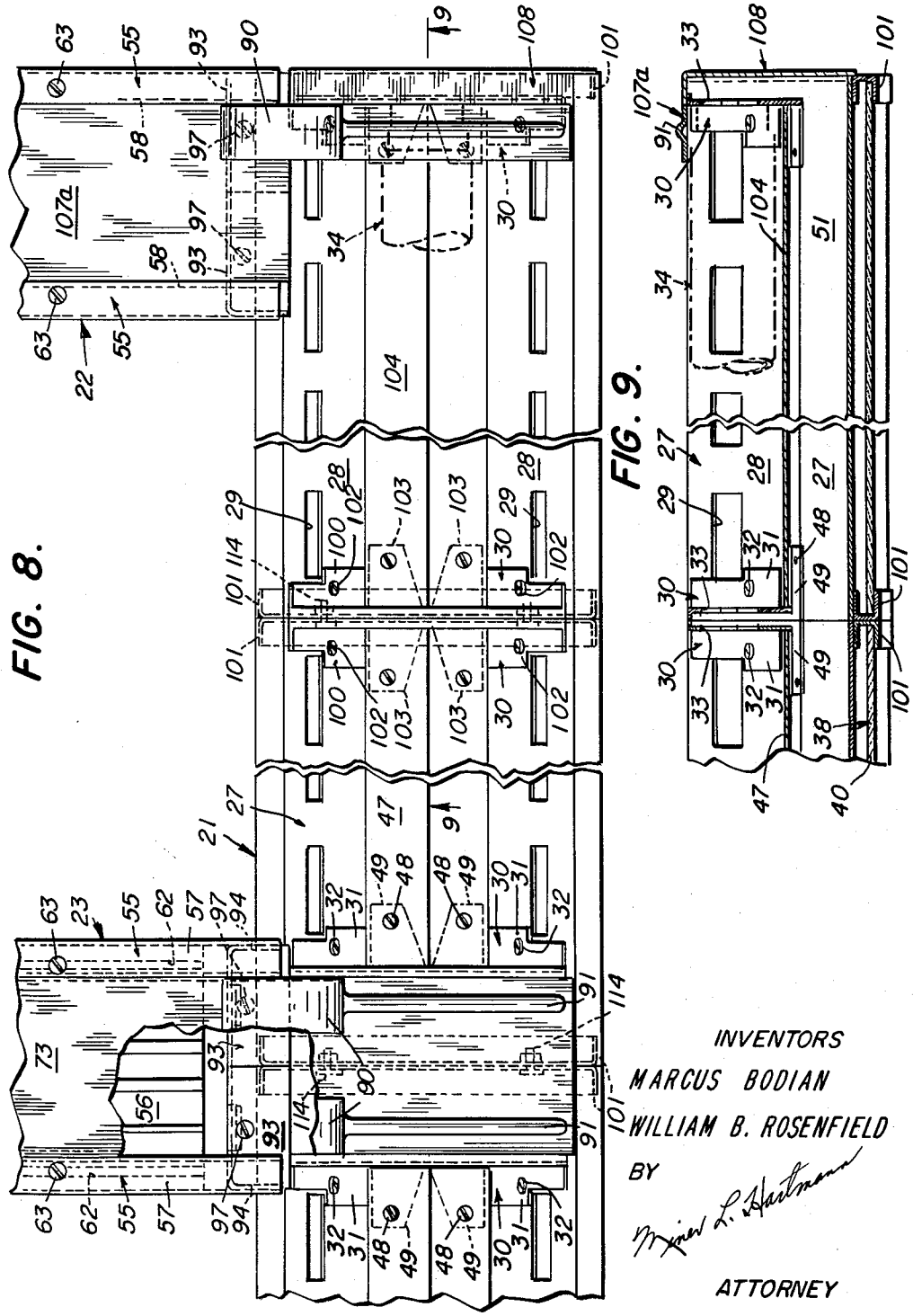

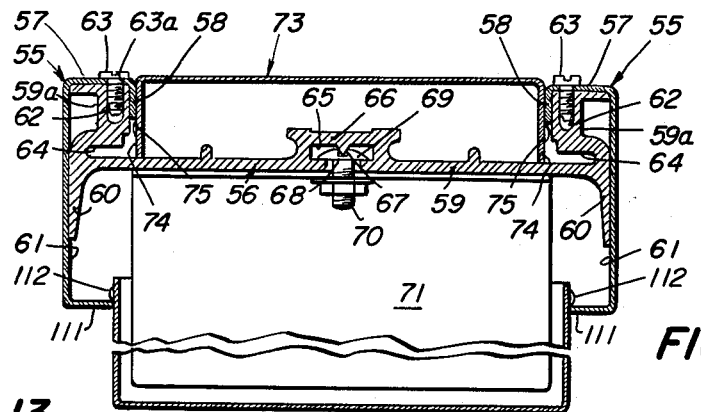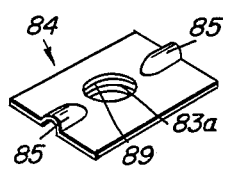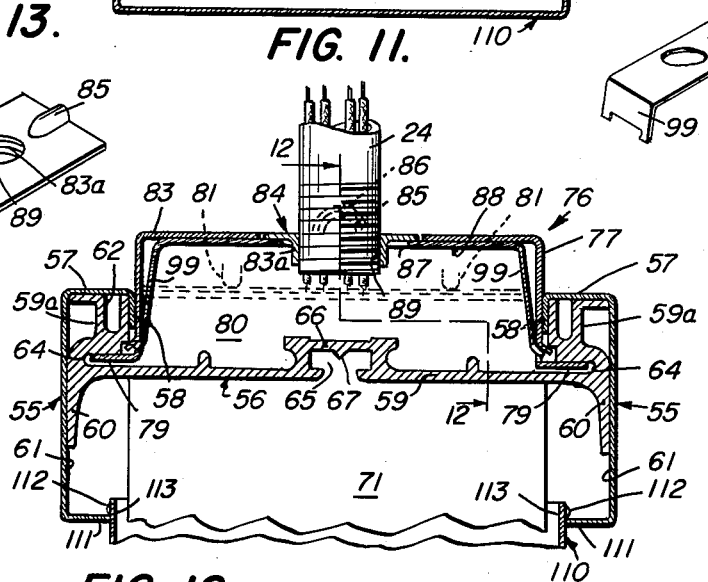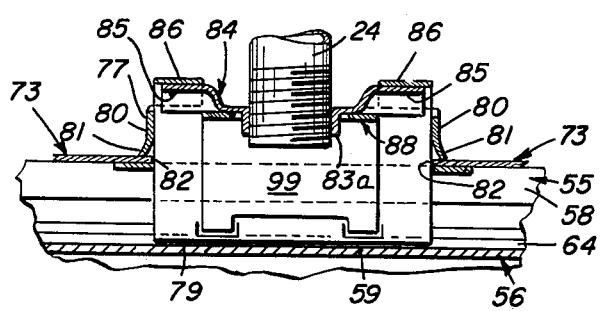

United States Patent Office 2,990,470
Patented June 27, 1961

---

2,990,470
REFLECTING FLUORESCENT LIGHT
FIXTURE
Marcus Bodian, Los Angeles, and William B. Rosenfield, Pacoima, Calif., assignors to Sunbeam Lighting Company, Los Angeles, Calif., a firm of California
Filed Mar. 10, 1958, Ser. No. 720,100
9 Claims. (Cl. 240—51.11)

This invention relates to a reflecting fluorescent light fixture.

In the lighting of rooms, particularly rooms of great size, and in the attainment of a desirable lighting condition which avoids regions of objectionable brightness, a common practice has been to suspend fixtures from the ceiling with the light directed toward the ceiling and with the underside of the fixture either completely screening off direct downward light from the fluorescent lamps or, in some cases, transmitting direct downward light from the lamps through louvers or through diffusing lenses. Where louvers or openings are used, they present in certain positions direct light from the fluorescent tube which is of such brightness that it is objectionable to the eye. Where diffusing lenses are used, the diffuser becomes brighter than the lighted ceiling. On the other hand, when no light is allowed to pass directly from the fixture toward the floor, the fixture itself becomes a dark, contrasting object against the reflection-lighted ceiling, and the fixture also generally casts a shadow in some areas below it.

It is the principal object of this invention to provide a fluorescent light fixture or pattern of fixtures mounted adjacent a ceiling to produce maximum visual comfort as well as bright overall illumination.

Another object is to provide reflecting fluorescent light fixtures which because of internal reflection lighting present from below an appearance of uniform or softly contrasting brightness against the reflection-lighted ceiling.

Another object is to provide means for reflecting a fraction of the generated light into a diffuser, thereby avoiding bright spots and the gradual yellowing of the diffuser which results from subjecting it to direct light, including the ultraviolet light from the lamp.

Another object is to provide simple means for coloring the light reflected to the diffuser, to achieve changeable decorative effects.

A further object is to provide a dual light fixture with cross channels for supporting and for housing the ballast and wiring.

A still further object is to provide a twin reflecting light fixture which is readily assembled from previously wired, easily packed sections, to form continuous row mountings of any length.

These and other objects are attained by our invention which will be understood from the following description, reference being made to the accompanying drawings in which:

FIG. 5 is a cross-sectional view taken on the line 5—5 of FIG. 2;

FIG. 6 is a perspective view of a sub-assembly showing the clamping means for attaching the cross supporting and ballast-containing channels;

FIG. 7 is a perspective view of the movable hanger portion of the clamp for attaching the light housing to the cross channel, as shown in FIG. 6;

FIG. 8 is a top plan view taken from the position 8—8 of FIG. 5;

FIG. 9 is a vertical cross-sectional view taken on the line 9—9 of FIG. 8;

FIG. 10 is a cross-sectional view taken on the line 10—10 of FIG. 5;

FIG. 11 is a cross-sectional view taken on the line 11—11 of FIG. 5;

FIG. 12 is a cross-sectional view taken on the line 12—12 of FIG. 11;

FIG. 13 is a perspective view of the trunnion member for the hanger stem; and

FIG. 14 is a perspective view of the spring member for the trunnion of FIG. 13.

Figure 1:
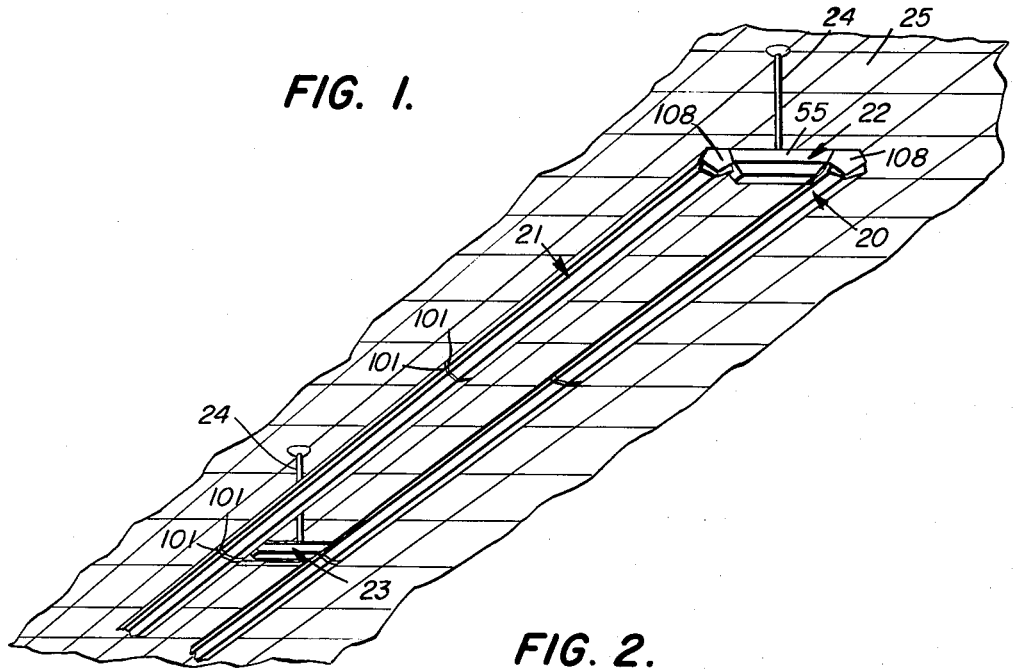
FIG. 1 is a perspective floor view of the dual reflector fluorescent light of this invention as suspended from a ceiling.
Figure 2:
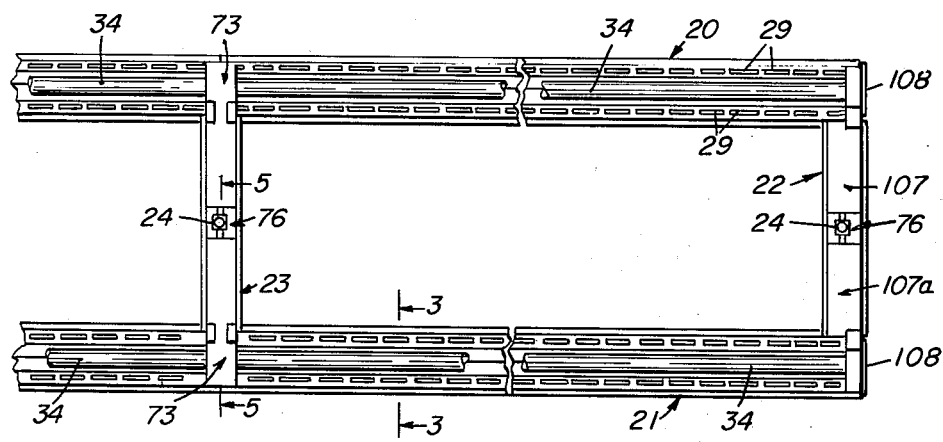
FIG. 2 is a top plan view of the fixture shown in FIG. 1.

In the preferred form of our invention shown in the drawings, a twin fixture consisting of a right hand lamp housing 20 and a left hand lamp housing 21 are arranged horizontally spaced apart in parallel relation, with connecting supporting cross-members. The terminal cross member 22 of a continuous row installation of twin fixtures, and the intermediate cross members 23, are each provided with stem hangers 24 mounted at mid-position between the housings 20 and 21. The stem hangers 24 are adapted to be mounted to a ceiling 25 in the usual manner, thus spacing the fixtures from the ceiling so that the ceiling itself acts as a light reflector for the main portion of the light generated in the lamps.

The lamp housings 20 and 21 each consist of a generally V-shaped channel 27 directed with the open side toward the ceiling, the side channel walls 28, in their upper portions, being provided with a plurality of window slots 29, through which a relatively small proportion of the light generated in the elongated fluorescent lamps 34 is reflected into a diffuser space to illuminate the diffuser 38. The light going through the window slots 29 is reflected from the reflecting surface 35 of the turned down margins 37 of the side walls 28 of the V-shaped lamp channel 27, the margins 37 being disposed at a selected small angle from the vertical, to reflect the light which comes through the window slots 29 into the diffuser trough 38, either directly or by a second reflection from the outer wall surface of the side walls 28, depending upon the position of the window slots and the angular disposition of the reflecting surfaces. Alternatively, a separate panel 35A (as indicated in broken lines on FIG. 3) may be attached to the reflecting surface 35 of the turned down margins 37, and the reflecting surface of this panel may be colored, so that the reflected light will similarly color the diffuser. In this way, a variety of decorative effects may be obtained, or the various colored diffusers may be used to indicate specific areas beneath the lights.

Figures 3, 4:
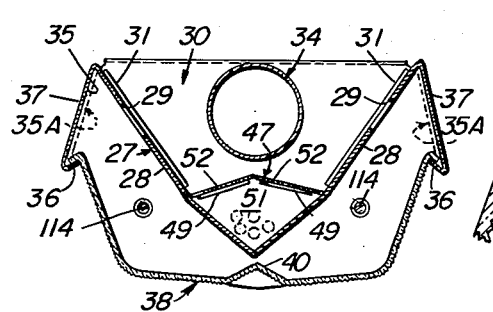
FIG. 3 is a cross-sectional view taken on the line 3—3 of FIG. 2.
FIG. 4 is an enlarged fragmentary sectional view showing the manner of mounting the diffuser.

The diffuser consists of a translucent, formed, synthetic plastic material trough 38 whose margins 39 are turned down slightly to engage the inclined in-turned hook flanges 36 of the turned down margins 37 (as shown particularly in FIGS. 3 and 4). The diffuser trough 38 is provided with an inwardly turned bottom rib 40 which serves to stiffen the structure in a longitudinal direction, and the outer surface of the diffuser trough is provided with longitudinal serrations 42 to further diffuse the light which is transmitted through it. The trough 38 is rigid, but may be distorted laterally by hand pressure to insert or withdraw it from the holding hook flanges 36. Socket mounting members 30 of generally triangular shape, and with turned margins 31 for attachment to the adjacent sides of the lamp channel 27 by means of screws 32, each socket mounting end being provided with a hole 33 arranged to receive the lamp sockets 45, and with in-turned tabs 49. The lamp sockets 45 are attached by bolts 43 to the end members by means of brackets 44.

The lower portion of the V-shaped lamp channel 27 is partitioned off horizontally by a longitudinally ridged cover 47 removably attached by screws 48 to the tabs 49 on the end members 30 to form an enclosed wire channel 51.

The cover 47 is longitudinally ridged so that downwardly directed light from the adjacent light tube 34 will be reflected angularly from both angularly disposed surfaces 52 of the cover 47, and thus be added to the main light emission directed toward the ceiling.

The terminal supporting cross members 22 and the intermediate supporting cross members 23 consist generally of a pair of side channels 55, disposed on edge, with the open channels facing each other and engaging between them a shaped, extruded metal support member 56. The upper edge 57 of the channels 55 is provided with a depending flange 58. The extruded support member 56 (see FIGS. 10 and 11) consists of a rigid horizontal plate 59 extending from one side channel 55 to the opposite side channel 55, the side edges of said plate 59 being each provided with a depending flange 60 abutting the inside surface 61 of the said channels. A bead 59A extending above the plate 59 from said depending flanges 60 is provided integral with said plate, this bead being proportioned to fit snugly within the upper edge 57 of the channels 55, and against the inside surface of the depending flange 58. Horizontal recess slots 64 in the bead 59A are provided for holding the stem attachment means to be described below. A longitudinal vertical screw slot 62, extending from end to end of the extrusion member 56, in the bead 59A from the top surface thereof, provides means for fastening the channels 55 to the extrusion member 56 by means of screws 63 in said screw slots, with punched holes 63A provided in the edge 57.

The plate 59 is also provided along its longitudinal center line with a screw head slot 65 which is enclosed on the upper face by the integral screw head slot cover 66 on the under side of which is an angular rib 67 which is arranged to engage in the slot 68 of the screw head 69 of the screws 70, which are adapted to support the ballast unit 71. The space above the plate 59 serves as a wire-way carrying the electrical lead wires from the hanger stems 24 to the ballast and to the sockets for the lamps in the lamp housings. This wire-way is enclosed on the top side by a sheet metal cover 73 having depending longitudinal edges 74 which fit snugly into the space between the depending flanges 58 of the channels 55; there being spaced-apart blisters 75 which removably hold the cover in place by engaging the lower edge of the side depending flange 58.

At the center of the cross members 22 and 23 are mounted attachment means 76 for the stem hangers 24 consisting of a sheet metal spring housing box 77 extending across the wire-way defined by the depending flanges 58 and the plate 59. The box 77 is disposed with the open face over the wire-way, the sides 78 of the box being provided with out-turned flanges 79, which are arranged to engage the horizontal slots 64 between the bead 59A and the plate 59. The end members 80 of the box 77 extend across the wire-way with clearance thereunder for electrical wires, there being strike-out tabs 81 provided on the end members 80 in position to engage the abutting ends 82 of the wire-way cover 73. The top 83 of the box 77 is apertured as at 87 to receive the base 83a of the trunnion member 84, the trunnions 85 extending oppositely, and being engaged under the half round bearings 86 formed in the top surface 83 of the box 77. A threaded hole 89 is provided in the center of the trunnion member 84, this hole threadedly engaging the stem 24. A broad U-shaped plate spring 88 having a central aperture to permit the passage therethrough of the electrical conduits from the stem, presses upwardly against the trunnion base, the legs 99 of the spring 88 being bent outwardly at their ends to engage the horizontal recess slot 64 in the bead 59A. The stem 24 may thus be positioned at an angle from the horizontal in any compass position.

A box-like ballast cover 110 to enclose the suspended ballast unit 71 is removably attached to the lower edges 111 of the side channels 55 by means of blisters 112 on the edges 113 of the cover, which make snap-connections to the channel edges.

The wire-way cover 73 extends from the end members 80 of the spring housing box 77 to the outside edge of the lamp housing, there being provided formed hump channels 90 on each side providing continuous wire-ways over the clamp connections between the cross members and the light housings. The cover 73 is also conveniently provided with reinforcing ribs 91 to improve the rigidity of said cover.

The cross members are each removably attached at both ends to the turned-down margins 37 of the lamp housings 20 and 21 by clamp means 92 consisting of a body member 93 which is attached to the adjoining side channel 55, for example, by spot welding as indicated at 94; the movable clamp member 95 (shown in FIG. 7) engages the hook flanges 36 of the turned-down margin 37; and the fixed clamp member 96, which is integral with the clamp body member 93, engages the joining edge between the turned-down margin 37 and the side walls 28 of the lamp channel 27. Each clamp is assembled and actuated by means of a clamp bolt 97 which extends between the movable clamp member 95 and the fixed clamp member 96.

The cross members are preferably spaced apart for a distance to accommodate standard lengths of fluorescent lamps, which are generally eight feet in length. For using four-foot length lamps without involving additional cross members, the alternative structure shown in FIGS. 8 and 9 may be employed. Intermediate lamp sockets 100 are mounted on the splice mounting plates 101, these plates being generally triangular in shape to fit across the upper portion of the lamp housings 20 and 21. Two of these mounting plates generally are arranged in back to back relation and each has mounted thereon a return lamp socket 100, directed in opposite directions. The splice mounting plates 101 are attached to the side walls 28 of the lamp channel by attachment screws 102; these plates being also provided with tabs 103 for supporting the shortened light channel wire-way covers 104, which are required in this alternative structure.

The parts may be assembled to form fixtures in rows of any length, being bolted together by bolts 114, or they may be formed into units of single tube lengths, with terminal cross members at both ends. In assembling the lamp housings and the cross members, it will be understood that the intermediate cross members 23 are spaced so that the physical joint between the lamp housing sections is in the horizontal center line of the cross member, one of the pair of lamps 92 being attached to the respective abutting ends of the lamp housing. For the terminal cross members 22, both clamps are attached to the lamp housing adjacent its end, as shown particularly in FIG. 8, and a half-width cover portion 107a, 107, continued from a full-width cover for the cross member wire-way is provided so that none of the fluorescent lamp lighted surface is obscured at the end of a row. An ornamental medallion 108 may be attached to provide a finish cover over the ends of the lamp housings and the end surface of the terminal cross member 22.

The complete wiring of the lamp parts is not shown, as this is conventional.

The advantages of our invention will be understood from the above description. The structure described accomplishes the objectives stated in the beginning. The units may be assembled using a minimum number of interchangeable parts for obtaining any ceiling pattern which may be desired. The fixture parts, such as the cross members and the light channels, may be completely wired in disassembled condition and may be easily electrically connected by the simple splicing of leads prior to attaching the removable wire-way covers. The structure of the light channels permits the maximum amount of direct illumination to the ceiling with only a small selected fraction of the total light being directed through the windows to the diffuser to avoid shadows and bright spots. The separation of the wiring from the sources of heat, such as lamps and ballast, insures longer life for the installation. The use of reflected light to illuminate the diffuser prevents yellowing of the plastic lens. The lamps are easily serviced from the open face of the channels, and maintenance costs are low. The universal joint means for attaching the supporting stems to the cross members provides spring-damped swinging in any direction to avoid damage to the hanging means and the fixtures by vibration or jarring.

We claim:

1. A twin fluorescent ceiling light fixture comprising a pair of lamp housings, each having an open lamp channel facing the ceiling, with fluorescent lamp mountings therein; a separated wire-way disposed below each of said lamp channels; a diffuser lens disposed in spaced relation below and coextensive with each of said lamp channels; said lamp channels having window slots through the sides thereof arranged to transmit a portion of the generated light into the space between said channel and said diffuser lens; reflector means for reflecting the generated light in each lamp channel from said windows to said lens; cross channel members supporting said pair of housings in spaced-apart relation at least some of said cross channel members containing ballast means and forming separated wire-ways for containing the electrical conduits; and means attached to said cross channel members for hanging said fixture in spaced-apart position relative to the ceiling.

2. A twin fluorescent ceiling light fixture comprising a pair of lamp housings, each having an open lamp channel facing the ceiling with fluorescent lamp mountings therein; a separated wire-way disposed below each of said lamp channels; a diffuser lens disposed in spaced relation below and coextensive with each of said lamp channels; said lamp channels having window slots through the sides thereof arranged to transmit a portion of the generated light into the space between said channel and said diffuser lens; reflector means for reflecting the generated light in each lamp channel from said windows to said lens; cross channel members attached at a horizontal right angle adjacent the ends of said housings and supporting them in spaced-apart relation, at least some of said cross channel members containing ballast means and forming separated wire-ways for containing the electrical conduits; and means attached to said cross channel members for hanging said fixture in spaced-apart position relative to the ceiling.

3. A twin fluorescent ceiling light fixture comprising two parallel rows of lamp housings, the lamps in each row disposed in abutting end-to-end relation, each individual housing having an open lamp channel facing the ceiling with fluorescent lamp mountings therein; a separated wire-way disposed below each of said lamp channels; a diffuser lens disposed in spaced relation below and coextensive with each of said lamp channels; said lamp channels having window slots through the sides thereof arranged to transmit a portion of the generated light into the space between said channel and said diffuser lens; reflector means for reflecting the generated light in each lamp channel from said windows to said lens; cross channel members attached at horizontal right angles adjacent the terminal ends of the rows and at intermediate abutting ends of said light housings, said cross channel members supporting said rows of housings in spaced-apart relation, at least some of said cross channel members containing ballast means and forming separated wire-ways for containing the electrical conduits; and means attached to said cross channel members for hanging said fixture in spaced-apart position relative to the ceiling.

4. A fluorescent ceiling light fixture comprising a plurality of rows of lamp housings, the lamps in each row disposed in abutting end-to-end relation, each individual housing having an open lamp channel facing the ceiling with fluorescent lamp mountings therein; a separated wireway disposed below each of said lamp channels; a diffuser lens disposed in spaced relation below and coextensive with each of said lamp channels; said lamp channels having window slots through the sides thereof arranged to transmit a portion of the generated light into the space between said channel and said diffuser lens; reflector means for reflecting the generated light in each lamp channel from said windows to said lens; cross channel members attached at horizontal right angles adjacent the terminal ends of the end housings in adjacent rows, and at intermediate abutting ends of said housings in adjacent rows, said cross members supporting said rows of housings in spaced-apart relation, at least some of said cross channel members containing ballast means and forming separated wire-ways for containing the electrical conduits; and means attached to said cross channel members for hanging said fixture in spaced-apart position relative to the ceiling.

5. In a fluorescent ceiling light fixture having an elongated opaque lamp trough directed toward the ceiling, and having a light-transmitting dished diffuser spaced below said trough, walls for said trough consisting of angularly disposed elongated plates provided with window slots in position to receive direct light from a fluorescent lamp mounted in said fixture, and elongated reflecting plates depending from the upper edges of said lamp trough, said reflecting plates being disposed opposite said window slots, and angularly positioned to reflect the light transmitted through said window slots in a downwardly direction whereby to illuminate the interior of said dished diffuser.

6. In a fluorescent ceiling light fixture having an elongated opaque lamp trough directed toward the ceiling, and having a light-transmitting dished diffuser spaced below said trough, walls for said trough consisting of angularly disposed elongated plates provided with window slots in the upper portion of said walls in position to receive direct light from a fluorescent lamp mounted in said fixture; and elongated reflecting plates depending from the upper edges of said lamp trough, said reflecting plates being disposed opposite said window slots, and angularly disposed to reflect the light transmitted through said window slots back against the outer surface of the non-slotted lower portion of said trough walls into said diffuser, said outer wall portion being provided with a light reflecting surface finish.

7. In a fluorescent ceiling light fixture having an elongated opaque lamp trough directed toward the ceiling, and having a light-transmitting dished diffuser spaced below said trough, walls for said trough consisting of angularly disposed elongated plates provided with window slots in position to receive direct light from a fluorescent lamp mounted in said fixture, and elongated colored reflecting plates depending from the upper edges of said lamp trough, said colored reflecting plates being disposed opposite said window slots, and angularly positioned to reflect the light transmitted through said window slots in a downwardly direction whereby to illuminate said diffuser.

8. In a fluorescent ceiling light fixture having an elongated lamp trough directed toward the ceiling, and having a diffuser coextensive with said trough and disposed below it, walls for said trough consisting of angularly disposed elongated plates provided with window slots in the upper portion of said walls in position to receive direct light from a fluorescent lamp mounted in said fixture; and elongated reflecting plates attached to the upper edges of said lamp trough, said reflecting plates being disposed opposite said window slots and being angularly disposed to reflect the light transmitted through said window slots back against the outer surface of the non-slotted lower portion of said trough walls, said outer wall portion being provided with a light reflecting surface finish; whereby to illuminate said diffuser, while avoiding exposure of said diffuser to direct light from the lamp in said trough.

9. In a fluorescent ceiling light fixture having an elongated lamp trough directed toward the ceiling, and having a diffuser coextensive with said trough and disposed below it, the walls for said trough consisting of angularly disposed elongated plates provided with window slots in the upper portion of said walls in position to receive direct light from a fluorescent lamp mounted in said fixture; and elongated colored reflecting plates attached to the upper edges of said lamp trough, said colored reflecting plates being disposed opposite said window slots, and being angularly disposed to reflect the light transmitted through said window slots back against the outer surface of the non-slotted lower portion of said trough walls, said outer wall portion being provided with a light reflecting surface finish; whereby to provide colored illumination to said diffuser, while avoiding exposure of said diffuser to direct light from the lamp in said trough.

References Cited in the file of this patent

UNITED STATES PATENTS

| | | |
|---|---|---|
| D. 169,999 | Ainsworth | July 14, 1953 |
| 2,124,432 | Ross et al. | July 19, 1938 |
| 2,196,214 | Kantack | Apr. 9, 1940 |
| 2,381,792 | Wakefield | Aug. 7, 1945 |
| 2,619,583 | Baumgartner | Nov. 25, 1952 |

FOREIGN PATENTS

| | | |
|---|---|---|
| 560,802 | Great Britain | A.D. 1944 |
| 670,205 | Great Britain | A.D. 1952 |